United States Patent [19]
Calfee

[11] Patent Number: 5,685,441
[45] Date of Patent: Nov. 11, 1997

[54] VIDEO DISPLAY PEDESTAL WITH ARTICLE STORAGE POCKETS

[75] Inventor: Clifford T. Calfee, Richardson, Tex.

[73] Assignee: Vu Ryte, Inc., Tyler, Tex.

[21] Appl. No.: 503,712

[22] Filed: Jul. 18, 1995

[51] Int. Cl.$^6$ .......................................................... A47F 5/00
[52] U.S. Cl. ........................... 211/194; 211/188; 248/917; 248/346.01; D14/114
[58] Field of Search ...................... 211/194, 188; 248/346.01, 346.07, 917, 924; D6/495, 511; D14/114

[56] References Cited

U.S. PATENT DOCUMENTS

| | | | |
|---|---|---|---|
| D. 283,323 | 4/1986 | Cervero | D14/114 |
| D. 291,204 | 8/1987 | Hampshire | D14/114 |
| D. 303,959 | 10/1989 | Suyama et al. | D14/114 |
| D. 334,921 | 4/1993 | Basara et al. | D14/114 |
| 2,506,844 | 5/1950 | Smith | 211/188 X |
| 2,660,117 | 1/1953 | Maunder | 101/407 |
| 3,549,020 | 12/1970 | Von Bohr | 211/188 X |
| 4,410,159 | 10/1983 | McVicker et al. | 248/349 |
| 4,415,136 | 11/1983 | Knoll | 248/181 |
| 4,542,872 | 9/1985 | Marino et al. | 248/183 |
| 4,544,122 | 10/1985 | Bumgardner | 248/346 |
| 4,577,187 | 3/1986 | Barr et al. | 340/700 |
| 4,681,378 | 7/1987 | Hellman | 211/194 X |
| 4,841,881 | 6/1989 | Battistella | 211/188 X |
| 4,875,179 | 10/1989 | Gelman | D14/114 X |
| 5,027,961 | 7/1991 | Howitt | 211/188 |
| 5,085,397 | 2/1992 | Henkel | 211/194 X |
| 5,104,086 | 4/1992 | Ramey et al. | 248/442.2 |
| 5,160,104 | 11/1992 | Sher | 248/176 |
| 5,250,851 | 10/1993 | McKnight et al. | 307/38 |
| 5,263,668 | 11/1993 | Rieter | 248/346 |
| 5,397,081 | 3/1995 | Landry et al. | 248/346 |

OTHER PUBLICATIONS

Ring King, Apr. 1, 1995 Pricing Guide.

*Primary Examiner*—Robert W. Gibson, Jr.
*Attorney, Agent, or Firm*—Dennis T. Griggs

[57] ABSTRACT

A video display unit such as a computer monitor or similar device is supported at a selected ergonomically correct height by a pedestal unit having one or more vertically stacked pedestal members, each defined by a generally horizontal plate portion and a depending wall. A peripheral ledge is interposed between the plate portion and the depending wall and the lower distal edge of the depending wall is spaced from an internal set of support gussets for supporting the pedestal members vertically stacked in nested relationship one on the other. Selected ones of the pedestal members have an opening in the side or depending wall portion providing a pocket for storing files, computer disks and other materials at the video display unit site. Opposed parallel inner walls extend from the opening to an opposite side wall to provide a smooth walled pocket for receiving the articles stored therein. The pedestal members are preferably formed of injection molded plastic and are preferably of a square cross sectional shape whereby the storage pockets may be arranged in selected positions with respect to each other.

13 Claims, 3 Drawing Sheets

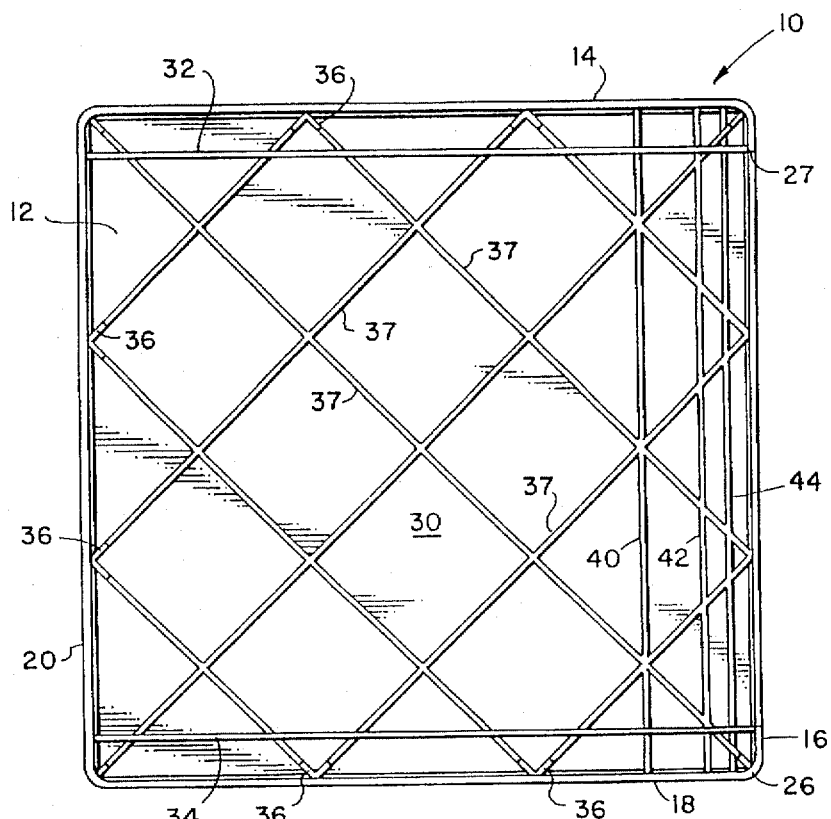
FIG. 4
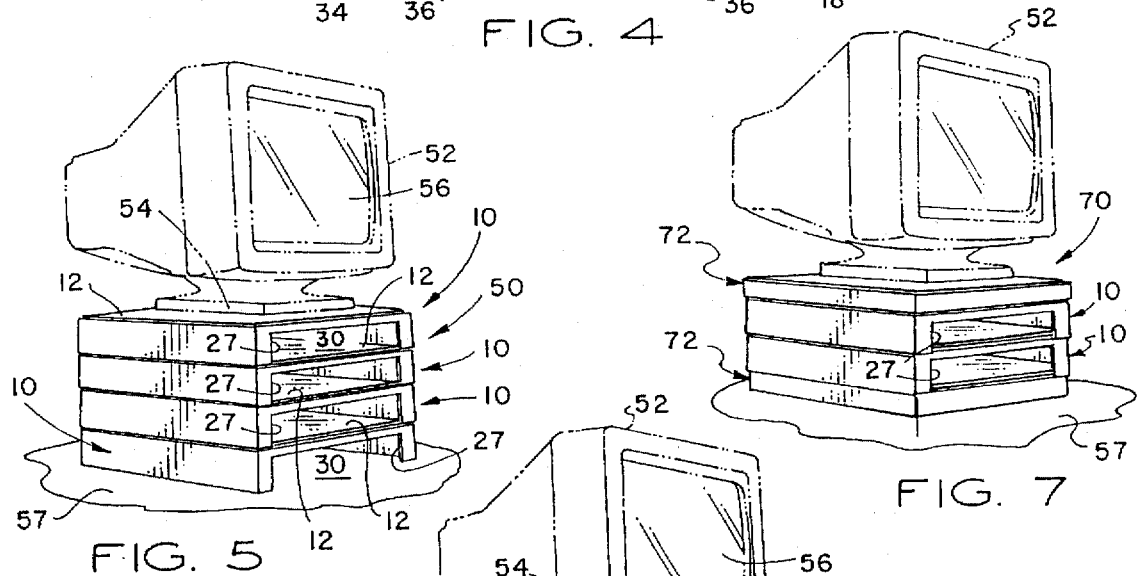
FIG. 5
FIG. 7
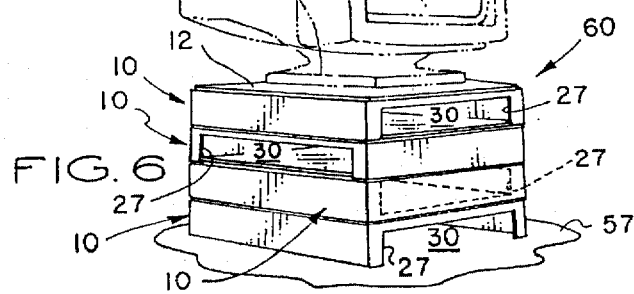
FIG. 6

VIDEO DISPLAY PEDESTAL WITH ARTICLE STORAGE POCKETS

FIELD OF THE INVENTION

The present invention pertains to a variable height video display unit support pedestal made up of selected numbers of stackable pedestal members which have pockets or receptacles for storing various articles including computer disks, papers, office supplies and the like.

BACKGROUND OF THE INVENTION

The correct position of a video display unit for a computer or similar electronic device is critical to reducing eye strain and fatigue of the person operating the computer or device. Computer operators and word processor operators, for example, spend long hours at a desktop keyboard with a video display unit mounted directly in front of them on the desk. The virtually infinite variety of computer units, video display units, office furniture and personal physical characteristics of computer operators has contributed greatly to the difficulty in providing means for correctly positioning the video display unit of computers, word processing systems and other video display units used in the workplace as well as for recreational and personal uses. Accordingly, there has been a continuing need to provide improved support structure for the monitor, CRT or video display unit associated with computers, word processing systems and other electronic devices.

Another need associated with the use of computer workstations and is convenient receptacles or "pockets" for storing various articles associated with the work process including computer disks, loose papers, files and other articles normally associated with an office or a work environment which involves the use of a computer and the associated video display unit.

Yet another need is an adjustable height pedestal which holds the screen of the video display unit remains in a substantially vertical plane and at the appropriate level for ergonomically correct line of sight between the operator and the display unit.

DESCRIPTION OF THE PRIOR ART

Various devices have been developed for supporting a video display unit or monitor for use by the operator of a computer or similar data processing equipment. Support pedestals for video display units have been developed which provide for swiveling and tilting the display unit to improve the line of sight of the operator with respect to the display unit screen. Tiltable video display pedestals may be unsuitable in many work environments in that the display unit screen may require to be tilted in a direction which provides undesirable reflections from ceiling mounted lighting, for example.

Stackable support pedestals have been provided with a combination base plate and upstanding easel for a computer workstation in accordance with U.S. Pat. No. 5,104,086. However, the stackable support modules described in that patent do not provide storage pockets or receptacles. Moreover, the peripheral groove in the horizontal top surface of the plates together with the inset downwardly projecting lip on the lower side of the plate presents certain manufacturing problems and may have reduced stability in pedestals which are made up of a large number of vertically stacked modules.

The present invention overcomes such limitations and provides certain advantages which are not found in conventional vertically fixed, tiltable or adjustable height pedestals.

SUMMARY OF THE INVENTION

The present invention provides an improved, stackable support pedestal for a video display unit for use at a computer workstation or any site wherein a video display unit is in use by an operator or observer.

In accordance with one aspect of the invention, a video display support pedestal is provided by a selected number of vertically stackable pedestal plates or modules which are uniquely configured to provide improved stability, are vertically stackable, interlock to each other to prevent unintended separation or shifting, and provide a selected arrangement of storage pockets or receptacles which may be positioned in a selected one of at least four different orientations with respect to a work surface.

In accordance with another aspect of the invention, a video display support pedestal member has a polygonal (preferably square) configuration and wherein at least one of the sidewalls of the pedestal member includes an open pocket or receptacle for storage of various articles including computer disks, papers and other office materials. Plural pedestal modules can be stacked vertically to form a pedestal unit having multiple pockets or receptacles aligned with each other, opposed to each other or normal to each other with respect to the exterior of the pedestal unit. Virtually any number of pedestal modules may be stacked to provide a desired height or orientation of a video monitor or other display device.

Still further in accordance with another aspect of the invention, a multi-part video display support pedestal which includes one or more pedestal members which have the same polygonal shape or cross-section as the pedestal members with the pockets, which do not have pockets and can be stacked in a selected mixed array of pedestal members with pockets to improve the load bearing ability and stiffness of the pedestal unit and to more accurately adjust the height of the pedestal unit.

The variable height pedestal unit provides correct ergonomic positioning of the monitor with an aesthetically pleasing, inexpensive, stable support structure which advantageously includes one or more pockets or receptacles for storing articles associated with the work process or similar activity occurring around the video display device. Operational features and advantages of the invention will be understood upon reading the detailed description which follows with reference to the drawings.

BRIEF DESCRIPTION OF THE DRAWINGS

FIG. 4 is a bottom plan view of the pedestal member of FIG. 1;

FIG. 5 is a perspective view of a pedestal unit in accordance with the invention supporting a video display device;

FIG. 6 is a view showing an alternate arrangement of the multiple pedestal members of a pedestal unit in accordance with the invention;

FIG. 7 is a perspective view similar to FIGS. 5 and 6 showing another combination of pedestal members forming a pedestal unit in accordance with the invention;

DESCRIPTION OF THE PREFERRED EMBODIMENTS

Figure 1:
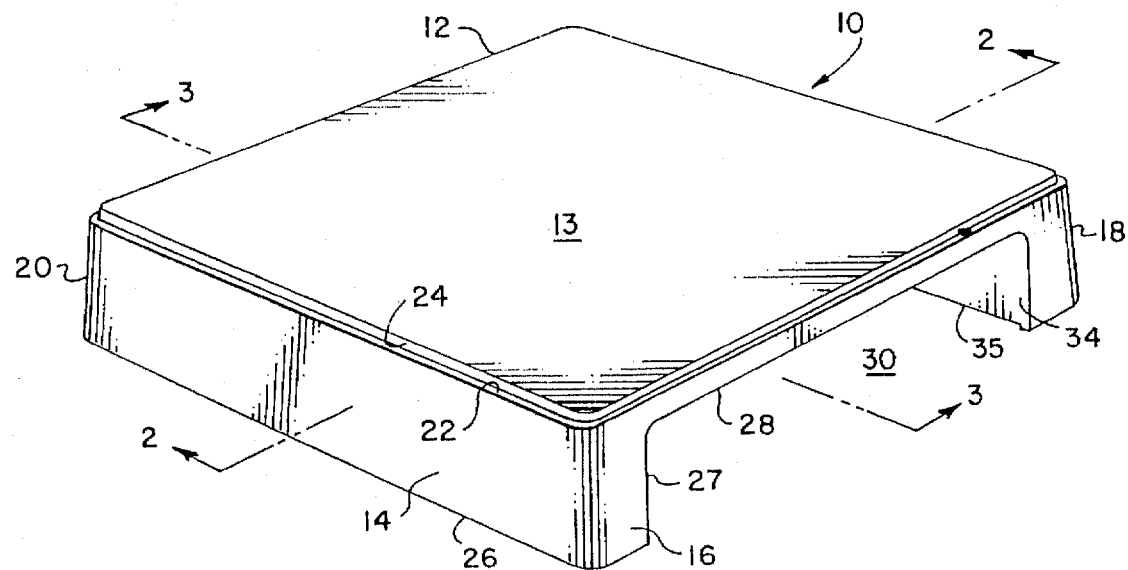
FIG. 1 is a perspective view of one of the pedestal members of the present invention.

In the description which follows like elements are marked throughout the specification and drawings with the same reference numerals, respectively.

Referring to FIGS. 1 through 4, a variable height pedestal unit of the present invention is an interlocked assembly of one or more unique pedestal members, generally designated by the numeral 10. Each pedestal member 10 is characterized by a polygonal, generally planar, support plate portion 12 having a planar support surface 13 and which is integrally formed with opposed depending interconnected sidewalls 14, 16, 18 and 20. The walls 14 and 18 are somewhat parallel to each other and the walls 16 and 20 are also generally parallel to each other and normal to the walls 14 and 18. The pedestal member 10 is advantageously provided with a peripheral recess formed by a generally horizontal ledge 22 at the juncture of the plate portion 12 with the depending walls 14, 16, 18 and 20. The peripheral ledge 22 is delimited by a vertical side edge 24 of the plate portion 12.

Figure 2:
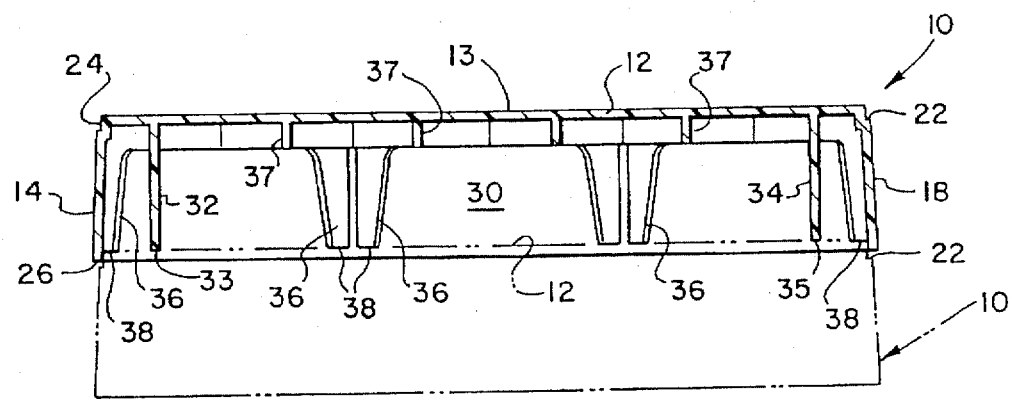
FIG. 2 is a section view taken along the line 2—2 of FIG. 1.

Plural pedestal members 10 may be stacked vertically, one on top of the other, in such a way that a lower peripheral edge 26 of the pedestal member may be disposed over and supported on the plate portion 12 of the member disposed below, as indicated in FIG. 2, without the edge 26 contacting the ledge 22. The depending walls 14, 16, 18 and 20 are tapered slightly outwardly with respect to each other from the ledge 22 to the peripheral edge 26 to provide for the vertical stacking of the pedestal members 10, to enhance the appearance of the pedestal member and a pedestal unit made up of plural ones of the pedestal members, to improve the stability of the pedestal unit and to facilitate forming the pedestal members out of a suitable plastic material in a permanent mold, for example.

Figure 3:
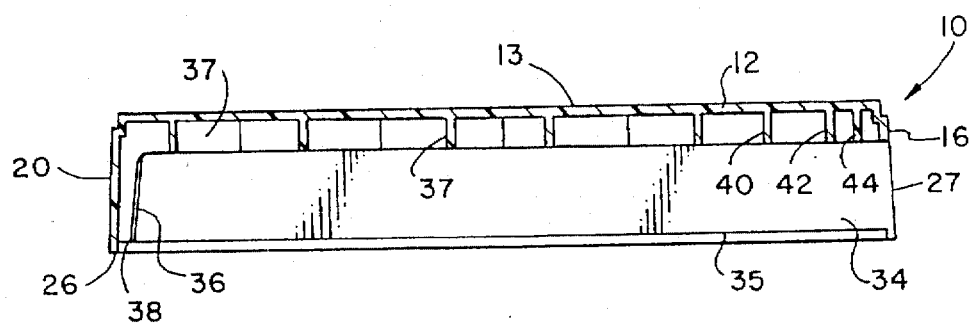
FIG. 3 is a section view taken along the line 3—3 of FIG. 1.

The pedestal member 10 advantageously includes a generally elongated rectangular opening 27 formed in the depending side wall 16 which is delimited by an upper generally horizontal edge 28 spaced from the ledge 22. The opening 27 provides access to a receptacle or pocket 30 which is also defined by elongated inner side walls 32 and 34 which are spaced from the side walls 14 and 18, respectively, are substantially parallel to each other and depend from the deck or plate portion 12. Lower distal edges 33 and 35 of the inner side walls 32 and 34 terminate at a point above the edge 26 slightly less than the height of the edge 24 of the plate portion 12 so as to receive the plate portion 12 of the pedestal member stacked below, see FIG. 2. Accordingly, the inner sidewalls 32 and 34 may engage the surface 13 of the plate portion 12 to support the pedestal member 10 above another member 10 disposed below. The inner side walls 32 and 34 extend between the opposed outer sidewalls 16 and 20, as shown in FIG. 3, and delimit the opposite sides of the pocket 30. In this way articles inserted in the pocket 30 do not become lodged within the interior of the pedestal member 10 since a smooth walled "channel" is provided for insertion and removal of such articles through the opening 27.

As shown in FIG. 4, the pedestal member 10 is advantageously provided with a diagonal pattern of webs 37 which are formed integral with and extend normal to the plate portion 12, and also form channels for improved flow of material in the mold used to manufacture the pedestal member 10. The webs 37 terminate at the sidewalls 14, 16, 18 and 20 at suitable gussets 36 which depend along the sidewalls and add rigidity to the sidewalls. The gussets 36 terminate at lower distal edges 38 which are preferably co-planar with the distal edges 33 and 35 of the inner sidewalls 32 and 34. Still further, the pedestal member 10 is preferably provided with plural spaced apart depending webs, 40, 42 and 44, FIGS. 3 and 4, extending parallel to each other adjacent to the opening 27 to reinforce the plate portion 12 near the sidewall 16, since the sidewall 16 is substantially reduced by the opening 27. The pedestal members 10 are preferably injection molded of a suitable plastic such as high impact polystyrene having a nominal wall thickness of the outer walls 14, 16, 18 and 20 and the plate portion 12 of about 0.12 inches. The inner walls 32 and 34 and the webs 36 may have a nominal thickness of about 0.09 inches. The webs 40, 42 and 44 may also have a nominal thickness of about 0.09 inches. The nominal dimensions of the pedestal member 10 may be on the order of about 11.25 inches square with a height of about 1.0 to 2.0 inches. The outward taper of the sidewalls 14, 16, 18, and 20 from the ledge 22 to the edge 26 is preferably at an angle of about 2.5° from a plane normal to the surface 13. The depth of the ledge 22 from the surface 13 of the plate portion 12 is on the order of about 0.15 inches and the vertical distance, viewing FIG. 2, between the distal edges 33 and 35 of the inner walls 32 and 34, as well as the distance between the distal edges 38, and the peripheral edge 26 is about 0.12 inches. Accordingly, the load bearing surfaces of vertically stacked pedestal members 10 are the surface 13 of the plate portion 12 which is contiguous with the distal edges 33, 35 and 38, respectively, of the adjacent nested pedestal member 10.

Referring now to FIG. 5, there is illustrated a pedestal unit 50 for supporting a video display device or monitor 52 having a base 54 and a viewing screen 56. The base 54 is disposed on the plate portion 12 of one of the pedestal members 10. As shown by way of example in FIG. 5, the pedestal unit 50 is made up of four vertically stacked pedestal members 10 which are suitably nested one within the other at the cooperating ledges 22 and lower distal edges 26, respectively. The number of pedestal members 10 utilized to make up a pedestal unit 50 may, of course, be varied from as few as one to virtually any suitable number to provide proper elevation of the display device 52 above a work surface 57 which may be a desktop, a horizontal top surface of a computer cabinet, or virtually any other suitable work surface.

In the pedestal unit 50, all of the pedestal members 10 are arranged such that their openings 27 are facing the same direction and toward an operator viewing the screen 56. Accordingly plural storage pockets are provided by the openings 27 having shelf surfaces defined by the plate portions 12 of the pedestal members disposed below. Of course, the lowermost pedestal member 10 utilizes the work surface 57 as a part of its pocket 30. Thanks to the construction of the pedestal members 10, wherein each member is provided with a ledge 22 and a lower peripheral edge 26 defined by the sidewalls of the pedestal member, the pedestal members may be stacked one on top of the other with substantial stability of the pedestal unit and with substantial resistance to shifting of one pedestal member relative to the other. Moreover, by utilizing the outwardly flared peripheral edge 26 for supporting the lowermost pedestal member 10 on the surface 57 added stability of the pedestal unit 50 is realized.

Referring now to FIG. 6, an alternate arrangement of the pedestal members 10 is shown and providing a pedestal unit 60. The pedestal unit 60 is similar to the pedestal unit 50 except the respective nested pedestal members 10 are arranged such that the pocket openings 27 face in two selected directions other than toward an operator viewing the screen 56. For example the lowermost pedestal member 10 has its pocket opening 27 facing toward an operator, not shown, while intermediate pedestal members have their pocket openings 27 facing perpendicular to the lowermost member and in opposite directions from each other. Finally, the uppermost pedestal member 10 has its pocket opening 27 facing in the same direction as the lowermost pedestal member. The combination of directions faced by the pockets 30 provided by the respective pedestal members 10, is variable, depending on the number of pedestal members used to make up the pedestal unit.

Referring now to FIG. 7, another embodiment of a pedestal unit in accordance with the invention is illustrated and generally designated by the numeral 70. The pedestal unit 70 is operable to support a video display unit 52 in substantially the same manner as the pedestal units 50 and 60. However, the pedestal unit 70 is also adapted to utilize one or more of a second pedestal member 72 similar to the pedestal members 10 but not having a pocket defining opening formed in a depending sidewall of the pedestal member. The pedestal unit 70 includes two pedestal members 72, one disposed as the top or uppermost member of the unit 70 and the other disposed as the base or lowermost member of the pedestal unit 70.

Figure 8:
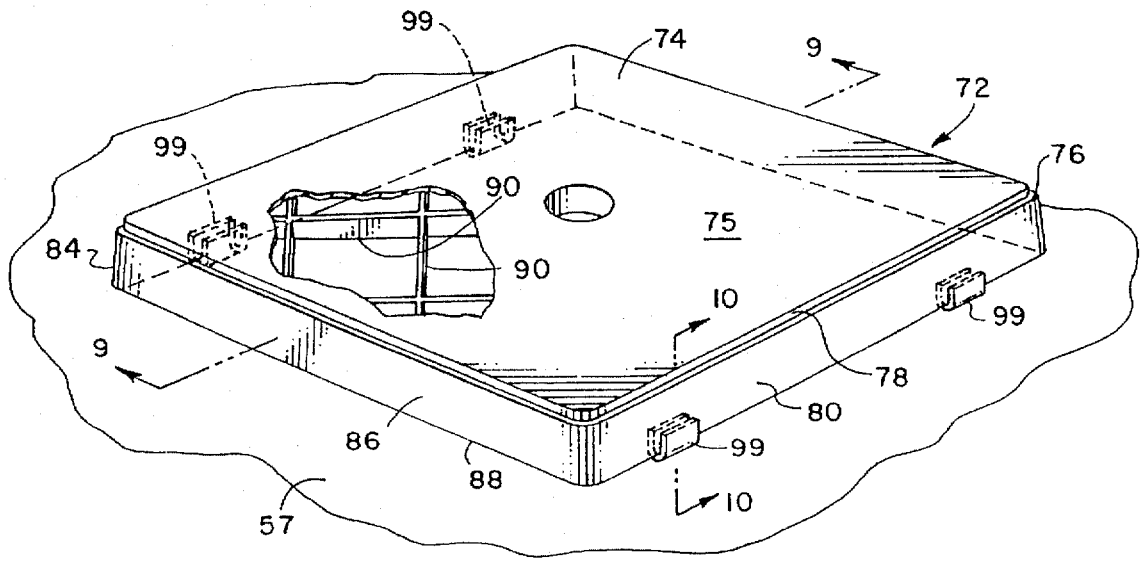
FIG. 8 is a perspective view of another one of the pedestal members used in making up a pedestal unit in accordance with the invention.
Figure 9:
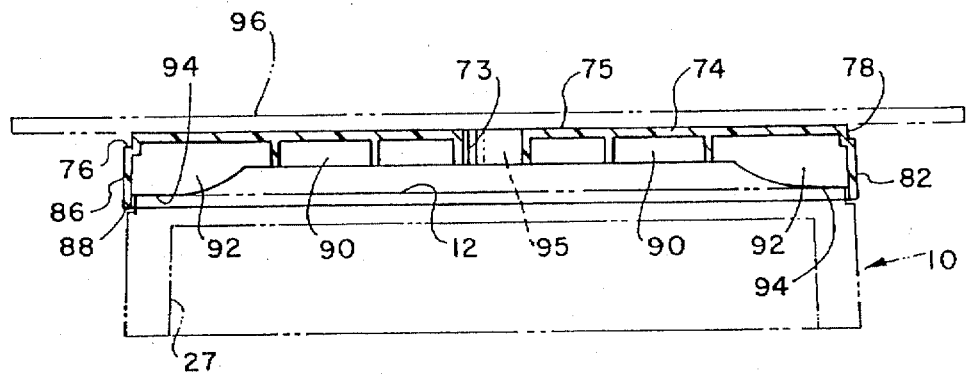
FIG. 9 is a section view taken along the line 9—9 of FIG. 8.

Referring now to FIGS. 8 and 9, the pedestal member 72 includes a generally horizontal plate portion 74 forming a support surface 75 delimited by a peripheral, generally horizontal inset ledge 76 and a peripheral edge 78 intersecting the ledge 76 in substantially the same manner as the construction of the pedestal members 10. Generally vertical depending sidewalls, 80, 82, 84 and 86 form a polygon of generally square configuration. However, as with the pedestal member 10, the pedestal member 72 may have a continuous curved depending peripheral sidewall or the sidewalls may form other selected geometry. The sidewalls 80, 82, 84 and 86 taper generally outwardly from the plate portion 74 to a lower peripheral edge 88 and the pedestal member 72 is also dimensioned such that the members may be stacked one on top of the other in nested relationship or stacked above, between or below one or more pedestal members 10. FIG. 9 shows one of the pedestal members 10 disposed below the pedestal member 72.

The pedestal member 72 is advantageously provided with diagonal webbing 90 integral with and extending normal to the plate portion 74 and terminating at opposed sidewalls in respective gussets 92. The gussets 92 terminate at distal edges 94 spaced from the edge 86 a distance slightly less than the distance between the ledge 76 and surface the surface 75 of plate portion 74 and the distance between the ledge 22 and the surface 13 plate portion 12 of the pedestal members 10. In this way the pedestal members 72 may be stacked on each other or a pedestal member 10 in nested relationship with the edges 94 in engagement with the plate portions 74 or 12 in load bearing relationship therewith. Still further, the pedestal members 72 as well as the pedestal members 10 may be provided with a central, generally cylindrical opening 73 in the plate portion 74, which opening may be adapted to receive a central depending boss 95 for a generally planar support plate 96 having a larger surface area than the plate portion 74. Accordingly, for supporting video display devices which have a base larger than the plate portion 74 the support plate 96 may be supported on a pedestal member 72 or 10 in the manner shown in FIG. 9.

The pedestal member 72 may be constructed in substantially the same manner as the pedestal member 10, the primary difference being in the arrangement of the webbing which reinforces and stiffens the plate portion 74 of the pedestal member 72, the lack of a sidewall opening for a pocket, and the overall height of the pedestal member between the plate portion 74 and peripheral lower edge 88. Of course, the pedestal member 72 may be made of an overall height of any selected dimension. One advantage of utilizing the member 72 is to provide more rigidity and distribution of forces in a pedestal unit having one or more pedestal members 10 utilized therein and wherein the weight of a video display device or other item supported by the pedestal unit may not be suitably borne directly by the plate portion 12 of a pedestal member 10 due to the opening 27 in sidewalls 16.

Figure 10:
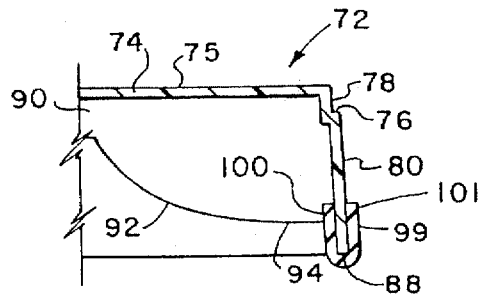
FIG. 10 is a section view taken along line 10—10 of FIG. 8.

Referring briefly to FIGS. 8 and 10, the pedestal member 72 may also be adapted to include plural spaced apart anti-skid feet 99 which may be removably secured to opposed sidewalls of the pedestal member 72, as shown, wherein a pair of feet 99 are disposed on each of the sidewalls 80 and 84, spaced apart, as illustrated. The feet 99 may be formed as somewhat resilient U-shaped channel-like members of a suitable elastomeric material having enough elastic memory in its flanges 100 and 101, FIG. 10, to provide for sliding the feet onto the edges of the sidewalls 80 and 84 in gripping engagement therewith. The feet 99 minimize the tendency for the pedestal member 72 and any pedestal unit including such member to skid on a support surface. The feet 99 are, of course, only secured to the lowermost or bottom pedestal member of a pedestal unit and generally in the manner shown in the drawing figures.

The construction and use of the pedestal members 10 and 72 and the arrangements of the pedestal units 50, 60 and 70 are believed to be understandable to those of ordinary skill in the art from the foregoing description. Although preferred embodiments of a pedestal unit and associated pedestal members in accordance with the invention have been described in detail herein, those skilled in the art will also recognize that various substitutions and modifications may be made without departing from the scope and spirit of the invention as set forth in the appended claims.

What is claimed is:

1. A pedestal member for use in a pedestal unit having at least one pedestal member for supporting a video display device and the like, said pedestal member being characterized by:

a generally horizontal plate portion;

depending wall means extending from said plate portion and having a lower edge;

support means disposed spaced from said lower edge and adapted to engage another pedestal member on which said pedestal member may be stacked;

an opening in said depending wall means and defining a storage pocket in said pedestal member; and, spaced apart interior wall means extending from opposite sides of said opening toward an opposed portion of said depending wall means.

2. The pedestal member set forth in claim 1 wherein:

said interior wall means includes a lower edge comprising said support means.

3. The pedestal member set forth in claim 1 including:

at least one web extending along said plate portion and adjacent to said opening for reinforcing said plate portion at the juncture of said plate portion with said depending wall means.

4. A pedestal member for use in a pedestal unit having at least one pedestal member for supporting a video display device and the like, said pedestal member being characterized by:

a generally horizontal, polygonal plate portion;

depending wall means integral with said plate portion and depending from each side of said plate portion;

support means formed on said pedestal member for engagement with another pedestal member for stacking said pedestal members generally vertically, one on top of the other, to provide a variable height pedestal unit;

an opening extending across a major portion of one of said depending wall means for a storage pocket formed in said pedestal member between said plate portion and a surface on which said pedestal member may be disposed; and, spaced apart interior wall means extending from opposite sides of said opening toward an opposed portion of said depending wall means.

5. The pedestal member set forth in claim 4 wherein:

said interior wall means includes a lower edge comprising said support means.

6. A pedestal unit for supporting a video display device and the like at a selected height above a work surface, said pedestal unit including a plurality of vertically stacked pedestal members, each of said pedestal members comprising a generally horizontal plate portion, depending wall means disposed around the periphery of said plate portion, a ledge interposed between said depending wall means and said periphery of said plate portion and support means adapted for engagement with at least one of a plate portion and a ledge of another pedestal member to form a rigid variable height pedestal unit, and at least one of said pedestal members has an opening in said depending wall means providing an entry to a storage pocket in said pedestal unit.

7. The pedestal unit set forth in claim 6 wherein:

the lowermost pedestal member of said pedestal unit has anti-skid means disposed on said depending wall means and engagable with a surface on which said pedestal unit is disposed.

8. The pedestal unit set forth in claim 7 wherein:

said anti-skid means comprises plural resilient feet disposed spaced apart on said depending wall means.

9. A pedestal unit for supporting a video display device and the like at a selected height above a work surface, said pedestal unit comprising a plurality of vertically stacked pedestal members, each of said pedestal members having a generally horizontal polygonal plate portion, plural opposed depending walls extending from said plate portion, support means on each of said pedestal members engagable with an adjacent pedestal member for stacking said pedestal members in a vertically stacked and nested relationship, at least one of said pedestal members including an opening in one of said depending walls providing a storage pocket for receiving articles for storage in said pedestal unit and at least one of said pedestal members having substantially continuous depending walls to increase the rigidity of said pedestal unit for supporting said device.

10. The pedestal unit set forth in claim 9 including:

a support plate having a support surface greater than said plate portion of the uppermost pedestal member of said pedestal unit and means on said support plate and said uppermost pedestal member for securing said support plate to said uppermost pedestal member.

11. A pedestal member for use in a pedestal unit having at least one pedestal member for supporting a video display device and the like, said pedestal member being characterized by:

a generally horizontally extending plate portion, said plate portion having plural sides forming at least one of a generally rectangular and square shape;

a peripheral ledge disposed along and delimiting the sides of said plate portion and defining a recess for receiving a peripheral lower edge of another pedestal member stacked on top of said pedestal member;

a depending wall extending from said ledge on each side of said plate portion; and an opening in said depending wall along one of said sides of said plate portion forming an entry to a storage pocket in said pedestal member.

12. A pedestal member for use in a pedestal unit having at least one pedestal member for supporting a video display device and the like, said pedestal member being characterized by:

a generally horizontal plate portion;

depending wall means extending from said plate portion and having a lower edge, said depending wall means tapering outwardly from said plate portion to said lower edge;

support means disposed spaced from said lower edge and adapted to engage another pedestal member on which said pedestal member may be stacked; and an opening in said depending wall means and defining a storage pocket in said pedestal member.

13. A pedestal unit for supporting a video display device and the like at a selected height above a work surface, said pedestal unit including a plurality of vertically stacked pedestal members, each of said pedestal members comprising a generally horizontal plate portion, depending wall means, a peripheral ledge interposed between said depending wall means and said plate portion and support means adapted for engagement with at least one of said plate portion and said ledge of another pedestal member to form a rigid variable height pedestal unit, at least one of said pedestal members has at least one opening in said depending wall means providing a storage pocket in said pedestal unit, and at least one of said pedestal members of said pedestal unit has a continuous depending wall and said one pedestal member having said continuous depending wall is disposed above said pedestal member having said at least one opening to provide for distributing the weight of said video display device and the like on said pedestal member having said at least one opening.

* * * * *